Dec. 27, 1949     D. G. GRISWOLD     2,492,859
CONTROL MEANS FOR FLUID PRESSURE OPERATED DEVICES
Original Filed May 1, 1940

Inventor
Donald G. Griswold
By Bacon & Thomas
Attorneys

Patented Dec. 27, 1949

2,492,859

UNITED STATES PATENT OFFICE 2,492,859

CONTROL MEANS FOR FLUID PRESSURE OPERATED DEVICES

Donald G. Griswold, Alhambra, Calif., assignor to Clayton Manufacturing Company, Alhambra, Calif.

Original application May 1, 1940, Serial No. 332,824, now Patent No. 2,366,144, dated December 26, 1944. Divided and this application July 1, 1944, Serial No. 543,081

6 Claims. (Cl. 277—51)

1

The present invention relates to automatic means for controlling the rate of operation of fluid pressure operated devices.

More particularly, the invention relates to a control unit for rendering a fluid pressure operated valve self-governing, the control unit being designed to control the operation of the valve so that the valve will at all times operate efficiently and quietly, and open automatically whenever the pressure on one side of the valve is greater than that on the other side of the valve and to close automatically when the pressure conditions are reversed.

The present application is a division of my copending application Serial No. 332,824, filed May 1, 1940, and entitled Pressure responsive valves, and which application has matured into Patent 2,366,144.

The principal object of the invention is to provide automatic control means for pressure fluid operated valves which will control both the opening and closing rates of such valves.

Another object of the invention is to provide automatic control means for fluid pressure operated valves which will control the closing action of the valve in such manner as to avoid chattering, hammering and line shock.

Another object of the invention is to provide a control unit for a fluid pressure operated valve by means of which both the opening and closing action of the valve may be regulated and controlled so that at least the closing action will be uniformly slow, and the opening action substantially unretarded so that the valve can be reopened to its fullest extent without undue delay.

Another object of the invention is to provide control means for a fluid pressure operated valve whereby the period of closing and opening of the valve may be varied as desired to meet specific conditions; for example, in certain installations employing large diameter pipe lines of great length and valves of large size, a total closing period of one to two minutes or more may be necessary to cut off flow without producing line shock or hammering, whereas it may be desirable to have the valve open substantially immediately to resume flow.

A further object of the invention is to provide a control device for a check valve which will render the check valve positive in its operation so that it will not waiver or flutter between opened or closed positions, but which in normal operation will maintain the valve either completely closed or fully open; complete closing avoiding undesirable leakage through the valve, and full

2 opening enabling the valve to operate with maximum efficiency without restricting or impeding flow therethrough.

Another object of the invention is to provide a control unit for use with a pressure fluid operated valve for positively controlling the opening and closing time of the valve.

A still further object of the invention is to provide an automatic control means for fluid pressure operated devices which is comparatively simple in construction, relatively inexpensive to manufacture, and which requires no substantial servicing.

Other and further objects of the invention will be apparent from the following description, taken in conjunction with the accompanying drawings, in which.

Figure 1:
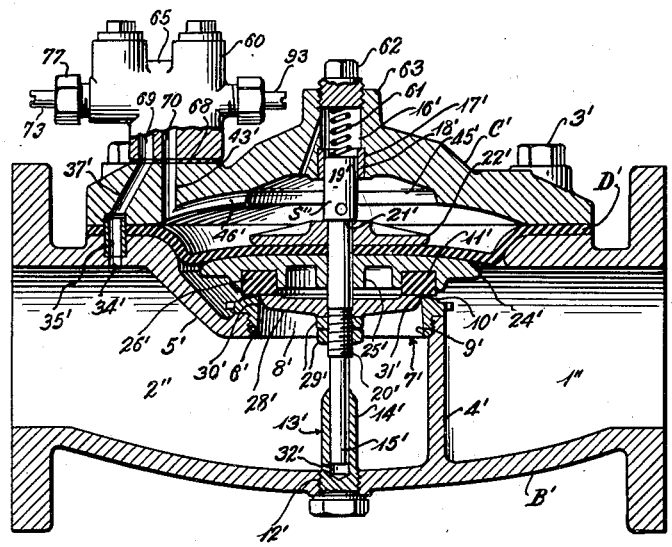
Figure 1 is a view partly in cross section of a valve including my novel control means for regulating the rate of opening and closing of the valve.

Referring now to Figure 1 of the drawings, the letter B' indicates the valve body and the numerals 1'' and 2'', respectively, indicate the inlet and outlet chambers or openings of the valve. The letter C' indicates the cap of the valve and the letter D' indicates a circular diaphragm whose marginal portion is clamped between the body B' and cap C' by any suitable number of cap screws 3'.

The body B' is provided at its inlet side 1'' with a substantially vertical partition wall 4' forming the inlet chamber 1'' and an angular wall portion 5' cooperating with the wall 4' to form the outlet chamber 2''. The wall portions 4' and 5' are merged to provide a circular opening 6' which is threaded and adapted to receive an annular valve seat 7'. The valve seat 7' is provided with a circular opening 8' which flares outwardly toward the bottom of the valve body as indicated at 9'. The upper surface of the valve seat 7' adjacent the opening 8' is provided with a declining beveled portion 10' adapted to cooperate with a valve disc 11' to form a leakproof seal, as will be explained more fully hereinafter.

The valve body B' has a threaded opening 12' axially aligned with the opening 8' in the valve seat 7'. An elongated plug 13' is threaded into the opening 12' and comprises a tubular guide portion 14' for the lower end 15' of a valve stem S''. The cap member C' also has a recess 16' counterbored at 17' to receive a guide bushing 18' for the upper end 19' of the valve stem S''. The recess 16' is located in the cap member C' so that it is axially aligned with the tubular guide portion 14' and the opening 8' of the valve seat. The valve stem S'' has a threaded portion 20' intermediate its lower end 15' and its upper end 19'. The end 15' is of slightly less diameter than the tubular threaded portion 20' and has a snug sliding fit in the tubular guide portion 14' of the plug 13'. The upper end 19' of the valve stem is enlarged to provide a shoulder at 21' and, moreover, is snugly guided in the bushing 18'. Thus, the plug 13' and bushing 18' are arranged to guide the stem S'' during vertical movement.

Figure 2:
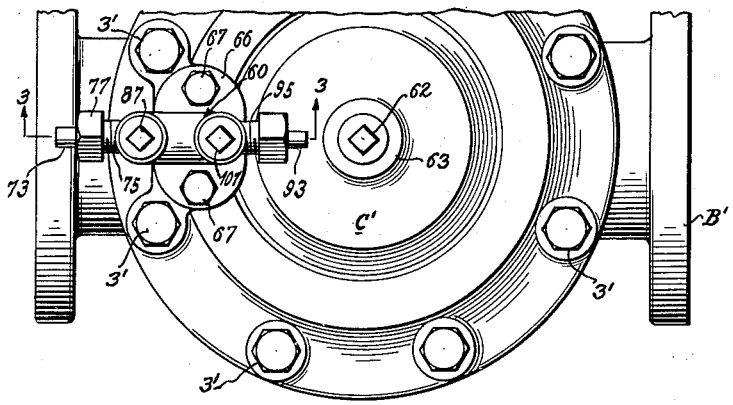
Figure 2 is a partial plan view of the valve shown in Figure 1.

An upper diaphragm supporting plate 22' is adapted to be received upon the stem S'' and to abut the shoulder 21' with the upper side thereof. The upper side of the diaphragm D' is engaged with the lower side of the plate 22' and is provided with an aperture through which the valve stem S'' extends. The lower side of the diaphragm D' is adapted to engage the upper side of a lower diaphragm supporting plate 24', and the valve stem S'' extends through a central boss 25' in said plate. The lower supporting plate 24' is also provided with a channel 26' formed in the lower side thereof to receive the disc 11' previously referred to. A combined clamping member and choke-washer 28' is adapted to be mounted upon the stem S'' and to engage the inner marginal portion of the valve disc 11'. Clamping nuts 29' are threaded upon the portion 20' of the valve stem S'' and serve to retain the valve stem, the diaphragm supporting plate plates 22' and 24', the valve disc 11' and the choke-washer 28' in assembled relation with the diaphragm D'. The outer diameter of the clamping member or choke-washer 28' is preferably only slightly less than that of the opening 8' of the valve seat 7'. In a 6 inch valve, for example, the maximum radial clearance may be only three or four thousandths of an inch. The peripheral edge of the choke-washer 28' is preferably rounded, as indicated at 30', and is tapered outwardly and upwardly from said rounded portion to substantially its upper outer edge, as indicated at 31' (and shown to an enlarged scale in Figure 2 of my parent application). The rounded and tapered peripheral portions of the choke-washer 28' serve to gradually cut off the flow through the opening 8' and the beveled portion 10' of the valve seat 7' cooperates with the valve disc 11' to reduce eddying and to form a theoretical line contact seal whereby tight, smooth and chatterless operation of the valve is obtained.

The tubular guide 14' with the lower end of the valve stem S'' is pierced by one or more transverse openings 32' arranged to establish communication between the outlet chamber 2'' of the valve and the interior of the guide. These openings obviously provide for free and unrestricted movement of the lower portion 15' of the valve stem in the guide 14'.

The valve body B', on the outlet side thereof, is provided with a passageway 34' adapted to receive one end of a short section of tubing 35'. The tubing 35' extends through an opening in the diaphragm D' and projects into a passageway 37' formed in the cap member C'. A control unit 60 is mounted on the cap member C' for controlling the opening and closing actions of the valve, respectively, as will be set forth more fully hereinafter. A passageway 43' in the cover C' establishes communication between the control unit 60 and a diaphragm pressure chamber 45' formed in said cover. A groove 46' communicates with the passageway 43' and will provide for admission of fluid into the pressure chamber 45' even though the diaphragm D' may be engaged with the inner face of the cover C'. A spring 61 is interposed between the upper end of the valve stem S'' and a plug 62 threaded into a boss 63 formed upon the cap member C'. The spring 61 may be desirable in some instances to provide an auxiliary differential pressure effective upon the upper end of the stem S'' to assist in closing the valve, although it will also be effective to oppose the opening of the valve to some extent. However, more important than these is the function of the spring 61 to offset any possible upward force resulting from the "buckling" effect of the diaphragm which might require a substantial excess of pressure in the diaphragm pressure chamber 45' above that in the inlet chamber 1'' to initiate the downward movement of the diaphragm. Another important function of the spring 61 is to supplement the closing pressure in the diaphragm chamber 45' by providing an ever-present potential pressure sufficient to overcome the slightly increased resistance to closing as the choke member 20' and the valve disc 11' are urged against the fluid flowing through the valve seat opening 18' to effect the final closing of the valve. The spring 61 is also helpful in the event that the pipe line becomes in such condition that the difference in pressure in the inlet and outlet of the valve is so slight that, if the valve were to remain open, a back flow would occur. In such case, the spring will provide the pressure differential necessary to initiate the closing movement of the valve in order that no substantial back flow can occur.

The pressure fluid from the outlet chamber 2' may be transmitted to the diaphragm chamber 45' through passageways 34', 37', a passageway 43' and a groove 46' in the cover C'. However, before the fluid can enter the diaphragm chamber 45' it must pass through the control unit 60.

The control unit 60 comprises a body portion 65 and a base portion 66 which is mounted upon the cap C' by cap screws 67. A gasket 68 having openings aligned with the passageways 37' and 43' is clamped between the cap C' and the base 66 in leakproof relation.

Figure 3:
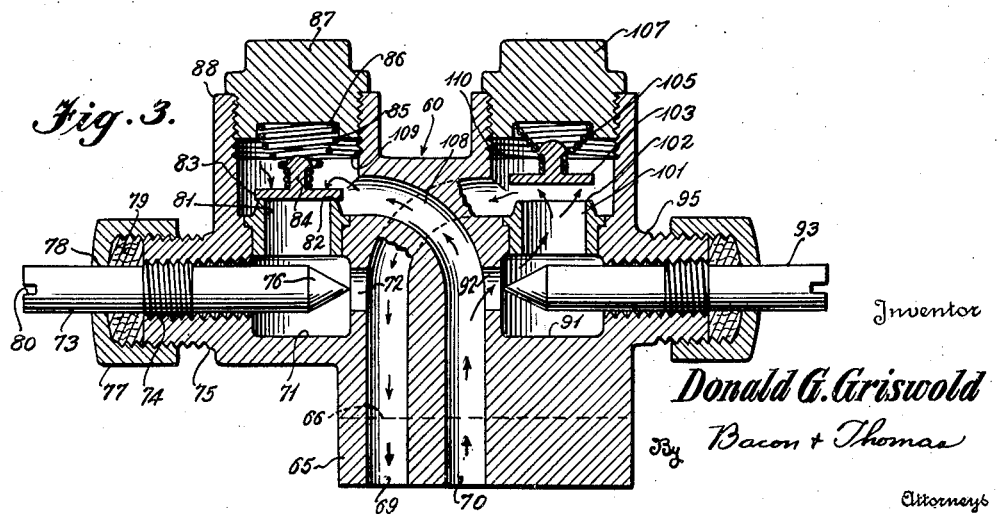
Figure 3 is an enlarged sectional view taken on the line 3—3 of Figure 2 through the valve control means.

The structural details of the control unit are best illustrated in Figure 3. Here the body 65 has a base surface engaging the gasket 68 and is shown provided with passageways 69 and 70 terminating at their outer ends in said base surface and adapted to be placed in aligned relation with the openings in the gasket 68 and the passageways 37' and 43' in the cap C'. The passageway 69 communicates with a chamber 71 in the body 65 through a port 72. A needle valve 73 is threadedly mounted, as indicated at 74, in a boss 75 projecting from the body 65. The needle valve 73 has a tapered end 76 adapted to be moved relatively to the port 72 to regulate the flow of fluid through said port. A hollow nut 77 is threadedly mounted on the boss 75 and one end of the needle valve 73 projects through an opening in said nut. The end of the needle valve 73 may be provided with a slot 80 to facilitate adjustment thereof.

A bushing 81 is mounted in the housing 65 at the upper end of the chamber 71 and its upper edge 82 is adapted to form a seat for a check valve disc 83. A stem 84 extends upwardly from the disc 83 and one end of a spring 85 is connected thereto. The opposite end of said spring is received in a recess 86 formed in the base of a plug 87 threadedly mounted in a boss 88 projecting upwardly from the body 65. The construction of the check valve disc 83 and spring 85 is such that said disc is permitted to leave its seat 82 when occasion requires, but is constrained from becoming misaligned with said seat by said spring.

The passageway 70 communicates with a chamber 91 through a port 92. A needle valve 93, similar to the needle valve 73, is adjustably mounted in a boss 95 to control the flow of fluid through the port 92.

A bushing 101 is mounted in the housing 65 at the top of the chamber 91 and its upper edge forms a seat 102 for a disc type check valve 103 similar to the check valve 83. A spring 105 is connected to the disc check valve 103 and is associated with the plug 107 in a manner similar to the spring 85.

It will be observed from Figure 3 that the passageways 69 and 70 overlap or cross each other in non-communicating relation, as indicated at 108, the passageway 70 communicating with a chamber 109 in which the check valve 83 is mounted. The passageway 69 communicates with a chamber 110 in which the check valve 103 is mounted.

The arrows in the various passageways of the control unit shown in Figure 3 indicate the direction of flow of the fluid when the main valve is opening. Thus, it will be apparent that, when the valve stem S'' is rising, fluid will be expelled from the diaphragm chamber 45' and will flow through passageway 43' into the passageway 70 of the control unit. From here, the fluid will pass through the port 92 at a rate permitted by the needle valve 93. The pressure of this fluid will lift the check valve 103 from its seat and permit the fluid to flow into the chamber 110, from whence it will flow into the passageway 69 and then drain back into the outlet chamber 2'' through the passageways 37' and 34'. It will be observed that, while the fluid from the passageway 70 raises the check valve 103 from its seat against the pressure of spring 105, the pressure of this fluid transmitted to the chamber 109 acts upon the check valve 83 to maintain it tightly against its seat.

During the closing of the valve, the operation would be the reverse. That is to say, fluid will flow from the outlet chamber 2'' through the passageways 34' and 37' into the passageway 69 of the control unit. The fluid will then flow through the ports 72 at the rate permitted by the needle valve 73 and will raise the check valve 83 from its seat against the pressure of the spring 85. Simultaneously, fluid from the passageway 69 will act downwardly upon the check valve 103 and maintain it upon its seat.

It will be apparent from the foregoing that adjustment of the needle valve 93 will control the rate of opening of the main check valve and that the adjustment of the needle valve 73 will control the rate of closing of the main check valve. The rate of closing and the rate of opening may thus be independently adjusted to provide, for example, a valve operation in which the main valve will close gradually and at a very slow rate to slowly cut off the flow of fluid through the valve, and the opening of the valve may be controlled so that it will occur at a relatively faster rate.

As a further variation, of course, the opening and closing of the valve may be timed to occur at the same rate. In any event, the operation of the valve will be automatic, once the needle valves 73 and 93 have been set. When the needle valve 73 is adjusted to provide for slow closing of the valve, the valve will close gradually against attempted back flow through the main valve and thus eliminate noisy operation and any possibility of the valve slamming shut. The control unit 60 thus provides for a uniform rate of closing as well as a uniform rate of opening of the main valve.

It will be understood that the principles of the invention may be embodied in control means different from that illustrated herein without departing from the spirit of the invention and the scope of the appended claims.

What I claim is:

1. A unit for use in controlling the flow of operating fluid to and from a pressure responsive device, comprising: a body having a base surface, said body having a pair of generally upright passageways and a pair of check valve chambers formed therein, each of said check valve chambers having an inlet side and an outlet side, said passageways terminating at their lower ends in said base surface and at their upper ends in one of the outlet sides of said check valve chambers, said body having a port communicating with each of said passageways at a point between said base surface and said check valve chambers; separate needle valves controlling the rate of flow of fluid from each of said passageways into its associated port; a pair of check valves, one in each of said check valve chambers arranged to seat in the same direction, said ports respectively establishing communication between the passageway associated therewith and the inlet side of the check valve chamber at the upper end of the other passageway, said needle valves being independently adjustable to control the flow of fluid in one direction from one of said passageways into the other at a given rate and to control the flow of fluid in the opposite direction from said other passageway into said first-mentioned passageway at a relatively greater rate.

2. A unit for use in controlling the flow of operating fluid to and from a pressure responsive device, comprising: a body having a pair of passageways and a pair of check valve chambers formed therein, each of said check valve chambers having an inlet side and an outlet side, said passageways crossing each other in non-communicating relation and respectively terminating in one of the outlet sides of said valve chambers, said body having a port communicating with each of said passageways and extending laterally therefrom and communicating with the inlet side of the valve chamber associated with the other passageway; a needle valve mounted in said body in alignment with each of said ports and respectively controlling the rate of fluid flow from each of said passageways into its associated port; valve means in one of said valve chambers for establishing communication between one of said passageways and the port of the other of said passageways for flow in only one direction therethrough; and other valve means in the other of said valve chambers for establishing communication between the other of said passageways and the port of said one passageway for flow only in the opposite direction therethrough, said needle valves being adjustable to control flow in said directions at different rates.

3. A unit for uniformly controlling the supply of operating fluid to and the exhaust of spent operating fluid from a pressure responsive device, comprising: a body having a base surface, said body having a pair of passageways formed therein to admit fluid into and to discharge fluid from said body and a pair of check valve chambers each having an inlet side and an outlet side, each of said passageways terminating in said base surface at its outer end and terminating at its inner end at the outlet side of a different one of said check valve chambers; a separate port opening into each of said passageways at a point intermediate its ends, the port of each of said passageways being in communication with the inlet side of the check valve chamber at the inner end of the other passageway; separate needle valves for controlling the rate of flow from said passageways into their respective ports; and a check valve in each of said check valve chambers, said check valves seating in the same direction.

4. A unit for uniformly controlling the supply of operating fluid to and the exhaust of spent operating fluid from a pressure responsive device, comprising: a body having a pair of passageways formed therein to admit fluid into and to discharge fluid from said body, said passageways crossing each other adjacent their inner ends in non-communicating relation and extending in opposite directions at said inner ends; a separate port opening into each of said passageways at a point spaced from said inner ends; separate needle valves for controlling the rate of flow from said passageways into their respective ports; and a pair of check valves, the check valves respectively being disposed between the inner end of one passageway and the port of the other passageway, said check valves seating in the same direction.

5. A unit for use in controlling the flow of operating fluid to and from a pressure responsive device, comprising: a body having a pair of generally vertical passageways formed therein to admit fluid into and to discharge fluid from said body and a pair of check valve chambers each having an inlet side and an outlet side, each of said passageways terminating at its upper end at the outlet side of a different one of said check valve chambers, said check valve chambers being disposed in substantially the same horizontal plane; a seat for a check valve in each of said check valve chambers; a separate port communicating with each of said passageways, the port of the respective passageways being in communication with the inlet side of the check valve chamber at the end of the other passageway; separate needle valves for controlling the rate of flow from said passageways into their respective ports; a check valve including a disc in each of said check valve chambers engageable with the seat therein, said check valves seating in the same direction; and spring means maintaining each check valve disc in substantial alignment with its associated seat and yieldably urging the same into engagement therewith.

6. A unit for use in controlling the flow of operating fluid to and from a pressure responsive device, comprising: a body having a pair of passageways formed therein to admit fluid into and to discharge fluid from said body and a pair of upright check valve chambers each having an inlet side and an outlet side, each of said passageways having an end terminating at the outlet side of a different one of said check valve chambers; a removable plug in said body providing a closure for the upper end of each of said check valve chambers; a check valve in each of said check valve chambers, said check valves seating in the same direction; a spring in each check valve chamber interposed between the check valve and the associated closure plug for the check valve chamber; a separate port opening into each of said passageways, the port of each of said passageways being in communication with the check valve chamber at the end of the other passageway on the inlet side of the check valve associated therewith; and separate needle valves controlling the rate of flow from said passageways into their respective ports.

DONALD G. GRISWOLD.

REFERENCES CITED

The following references are of record in the file of this patent:

UNITED STATES PATENTS

| Number | Name | Date |
|---|---|---|
| 840,876 | Steedman | Jan. 8, 1907 |
| 840,877 | Steedman | Jan. 8, 1907 |
| 1,923,127 | Veenschoten | Apr. 22, 1933 |
| 2,167,623 | Britter | Aug. 1, 1939 |